United States Patent Office 3,373,037
Patented Mar. 12, 1968

3,373,037
ESTROGENIC COMPOUNDS AND ANIMAL GROWTH PROMOTERS
Richard L. Abbott, Monroe, La., assignor to Commercial Solvents Corporation, a corporation of Maryland
No Drawing. Continuation-in-part of application Ser. No. 561,350, June 29, 1966. This application Mar. 6, 1967, Ser. No. 620,604
10 Claims. (Cl. 99—2)

ABSTRACT OF THE DISCLOSURE

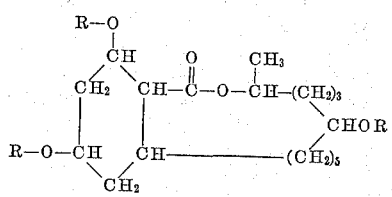

where R is selected from the group consisting of hydrogen, lower alkyl, lower saturated acylic acyl and benzyl and animal feeds containing the same.

---

This application is a continuation-in-part of application Ser. No. 561,350, filed June 29, 1966, now abandoned.

Products

The present invention relates to new compounds and an object of the present invention is to provide compounds which have anti-inflammatory activity or aid in increasing the rate of growth in meat-producing animals, e.g. cattle, lamb and swine.

The most widely used anti-inflammatory agents are the adrenocorticoids such as cortisone, hydrocortisone, predisone and prednisolone. Although these adrenocorticoids possess highly effective anti-inflammatory activity, they are not without criticism since, with overdosage or prolonged or intensive treatment, it is not unusual to find manifestations of undesirable side effects such as adrenal atrophy, peptic ulcer, sodium and fluid retention, etc. Accordingly, the desirability of realizing other anti-inflammatory agents is readily appreciated.

The compounds of this invention are illustrated by the formula:

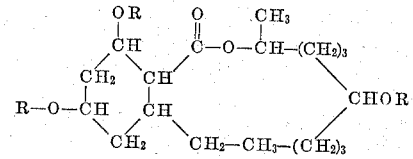

where R is hydrogen, substituted or unsubstituted alkyl, e.g. lower alkyl such as methyl, ethyl, hexyl, etc.; acyl, e.g. lower saturated acyclic acyl radicals

such as acetyl; or aralkyl, e.g. benzyl.

The compounds of the present invention can be produced from the compound:

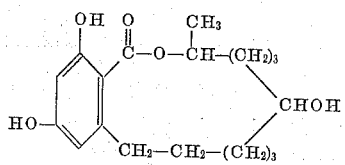

described in U.S. Patent 3,239,345, hereinafter referred to as the tetrahydro fermentation estrogenic substance (tetrahydro F.E.S.), by reduction in aqueous methanol with hydrogen in the presence of Raney nickel. There are two diastereoisomers of tetrahydro F.E.S. which can be distinguished by melting point and both are suitable starting materials for the compounds of this invention. The hydroxyl groups can be converted to ethers, e.g. methyl ethers, as taught in U.S. Patent 3,239,342. Compounds where R is benzyl are described in copending application Ser. No. 532,113, filed Mar. 7, 1966 now abandoned, and application Ser. No. 620,259, filed Mar. 3, 1967. U.S. Patent 3,239,347 describes F.E.S. compounds where R is acyl. In preparing compounds where R is a combination of alkyl and acyl, it can be desirable to first alkylate and then acylate the F.E.S. compound.

The following examples serve to illustrate the invention.

Example I

Low melting (146–148° C.) tetrahydro F.E.S. (0.401 g.) was dissolved in 200 ml. methanol plus 200 ml. methanol plus 200 ml. water and 10 g. Raney nickel and reduced for 10 hours at 1500 p.s.i. hydrogen and 200° C. The catalyst was filtered and washed with 20 ml. methanol. The methanol and water liquor was evaporated to dryness and the residue was extracted several times with ether to yield a mixture of isomers having the general formula

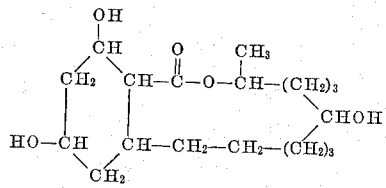

Infrared spectra ultraviolet spectra and mass spectra confirm the structure.

Example II

High melting (178–180° C.) tetrahydro F.E.S. (2.8 g.) is dissolved in 400 ml. methanol plus 300 ml. water and 10 g. Raney nickel and reduced for about 10 hours at 1500 p.s.i. hydrogen and 200° C. The catalyst is filtered and washed with methanol. The volume of the methanol and water liquor is then reduced to 100 ml. under vacuum and mild heating and the residue is extracted with six 50 ml. portions of ether and with six 50 ml. portions of carbon tetrachloride to recover 1.6 g. ether extract and 0.85 g. carbon tetrachloride extract which are essentially identical and saturated F.E.S.

Example III

To 10 ml. of water is added 0.5 g. of the compound prepared according to Example I and 2 g. of sodium hydroxide. The resulting mixture is stirred and an excess of dimethyl sulfate is added. The mixture is stirred and filtered to yield

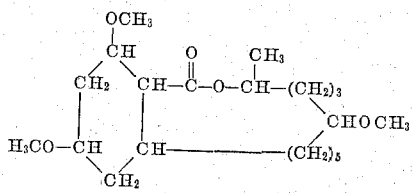

Example IV

To a solution of 368 mg. of the compound produced in Example I in 8 ml. pyridine is added an excess of acetic anhydride and the mixture is left at room temperature for 16 hours. 25 ml. of water are then added and the mixture stored in a refrigerator for several hours. The solid precipitate is recovered by filtration, washed with water, vacuum dried and recrystallized from methanol to yield

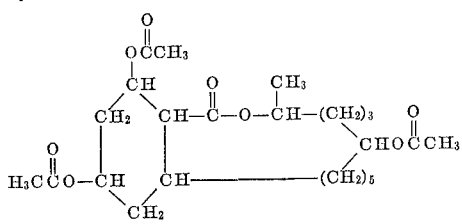

Example V

Dimethyl sulfate (5 ml.) was added to a solution of 2.24 g. F.E.S. in 80 ml. of a 10% NaOH solution and 20 ml. of water. The mixture was stirred for one-half hour at 18 to 20° C. (cooling bath) and an additional 5 ml. of dimethyl sulfate was added. After an additional 70 minutes of stirring at 20° to 26° C., the solid precipitate, Solid A, was collected by filtration, washed with water and dried. The filtrate from Solid A was acidified with 25 ml. of 12 N $H_2SO_4$ to yield a second precipitate, Solid B, which was collected, washed with water and dried.

Solid A (0.79 g. having a melting point of 114° to 118° C.) was recrystallized from a mixture of 10 ml. water and 15 ml. ethanol to yield 0.66 g. of F.E.S. 2,4-dimethylether having a melting point of 108° to 110° C.

Solid B (1.39 g. having a melting point of 152° to 162° C.) was recrystallized twice from a mixture of water and alcohol to yield 0.8 g. of F.E.S. 2-monomethylether having a melting point of 169° to 174° C., with the methyl group replacing the hydrogen in the hydroxyl group in the position ortho to the ester group. Analysis of Solid B showed—Calc. ($C_{19}H_{24}O_5$): C, 68.65%; H, 7.28%; OMe, 9.34%. Found, C, 67.97%; H, 7.16%; OMe, 9.28%.

Each of the F.E.S. 2,4-dimethylether and F.E.S. 2-monomethylether so produced are reduced according to the procedure of Example I. Acylation of the resulting compounds according to Example III produce, respectively,

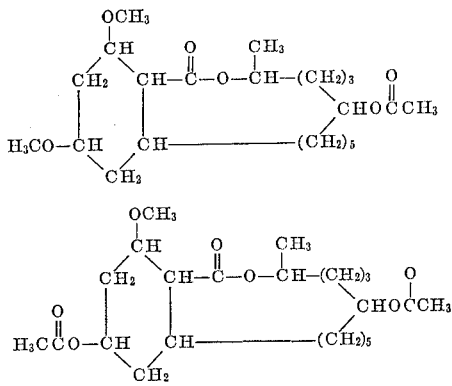

Example VI

Nitrosomethylurea in an amount of 1.2 g. was slowly added to a cold mixture of 3.6 ml. of 50% potassium hydroxide and 17 ml. of ether. After a few minutes the yellow ether layer of the mixture was decanted, dried over potassium hydroxide, and then added to a solution of 0.3 g. of F.E.S. in 17 ml. of ether. The resulting yellow mixture was left overnight in a loosely stoppered flask and then ether and diazomethane were evaporated using a steam bath. The remaining gummy residue was crystallized by adding 3 ml. of water, heating to 60° C., and adding ethanol almost to solution. On cooling, crystals formed yielding 0.137 g. of product having a melting point of 111° to 116° C. which was recrystallized in the same way to yield 0.082 g. of monomethyl F.E.S. having a melting point of 120° to 122° C. and analyzing—Calc. ($C_{19}H_{24}O_5$): C, 68.7%; H, 7.28%; $OCH_3$, 9.34%. Found, C, 68.3%; H, 7.38%; $OCH_3$, 9.17%.

The F.E.S. 4-monomethylether is reduced following the procedure of Example I and then acylated to the procedure of Example III.

Example VII

F.E.S. 4-benzylether is reduced according to the procedure of Example I.

Example VIII

Anti-inflammatory activity is shown for the compounds produced according to Examples I, II and III by the method of Sonelli, Shibault and Ringler, Endocrinology 77: 625, 1965 as similar to aspirin. Briefly, this method comprises topical coapplication of the test substance and a 1% croton oil vehicle to one ear of an intact rat while the other ear is used as a control. The 1% croton oil vehicle elicits a philogostic response characterized by edema, hyperemia and over-all increase in ear size. In each test six rats are used and after six hours the rat is lightly etherized and both ears removed and individually weighed. The anti-inflammatory effect of the test substance is determined by expressing the increase in weight of the tested ear as a percentage of the weight of the contralateral control ear. After 48 hours the rats are sacrificed and the thymi removed and weighed. The weight of the thymus after this time period is taken as an index of the systemic effects of the test substance.

The following are specific examples of animal feed compositions of this invention useful for increasing the rate of growth and feed efficiency of young animals to market weight.

Example IX

For young beef cattle, i.e., calves to yearlings running to two year olds, each animal is given 5 to 20 milligrams per day of the compound produced in Example I intimately admixed in about 18 to 22 pounds per head per day of a complete pelleted ration for about 180 days. The complete pelleted ration includes in addition to the compound of Example I the following:

| | | |
|---|---|---|
| Barley | percent | 40–43 |
| Molasses dried beet pulp | do | 34.5–37.5 |
| Alfalfa pellets | do | 8.0 |
| Tallow | do | 2.5 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | I.U./ton | 2–4MM |

Note: Milo or corn, for example, can be substituted for the barely.

The compound of Example I is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

Example X

For young swine, i.e., six weeks old pigs to about 100 pound pigs, each animal is given 5 to 20 milligrams per day of the compound of Example III intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example III intimately admixed in about 5½ to 10 pounds per head per day of a finisher ration until it reaches market weight of about 220 pounds. The grower and finisher ration include in addition to the compound of Example III the following:

| | Grower, percent | Finisher, percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The compound of Example III is admixed with the above ingredients in a blender in the following amounts in milligrams per pound to provide an appropriate feed with dosage levels ranging from 6 to 96 milligrams per head per day.

| Mg./pound: | Mg./head/day |
|---|---|
| 2 | 6 |
| 4 | 12 |
| 8 | 24 |
| 16 | 48 |
| 32 | 96 |

Example XI

For 4 to 10 month old lambs weighing 50 to 70 pounds, each animal is given 1 to 15 milligrams per day of the compound of Example IV, intimately admixed in about 3 to 6 pounds per head per day of a complete ration for 30 to 90 days. The complete ratio includes in addition to the compound of Example IV the following:

| | Lbs. |
|---|---|
| Finley ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example IV is admixed with the above ingredients in a blender in the following amounts in milligrams per pound to provide an appropriate complete feed with dosage levels ranging from 1 to 15 milligrams per head per day.

| Mg./pound: | Mg./head/day |
|---|---|
| .5 | 2 |
| 1.0 | 4 |
| 1.5 | 6 |
| 2.0 | 8 |
| 2.5 | 10 |
| 3.75 | 15 |

Example XII

For broilers, i.e., day old to four week old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feeds during the next five weeks. During the course of this feeding schedule, each bird should receive a total of about 12 to 36 milligrams of the compound of Example I in the grower and finisher feed each of which includes in addition to the compound of Example I the following:

| | Grower (lbs.) | Finisher (lbs.) |
|---|---|---|
| Ground Yellow Corn | 1,000 | 1,200 |
| Soybean Meal (44% Protein) | 700 | 500 |
| Fish Meal (60% Protein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | |
| Premix Vitamins Trace Minerals and Antibiotics | 10 | 10 |

Example XIII 242 grams of FES were dissolved in 5 gallons of isopropyl alcohol and the solution was charged to an autoclave together with 400 grams of Raney nickel. The autoclave was sealed, pressured with hydrogen to 500 p.s.i., heated to 80° C. and the reaction continued with stirring for five hours. The contents of the autoclave were filtered, 1500 milliliters of the filtrate were concentrated to 70 milliliters and, after remaining overnight, 4.68 grams of solids were recovered. Recrystallization of the solids from 100 milliliters of isopropyl alcohol gave 2.3 grams of the product of Example I having a melting point of 225–227° C.

*Analysis.*—Calculated: C, 65.82; H, 9.82. Found: C, 65.42; H, 9.81.

It is claimed:
1.

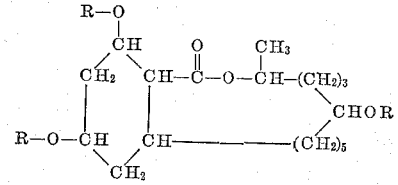

where R is selected from the group consisting of hydrogen, lower alkyl, lower saturated acylic acyl and benzyl.
2. The compound of claim 1 wherein R is hydrogen.
3. The compound of claim 1 wherein R is lower alkyl.
4. The compound of claim 1 wherein R is methyl.
5. The compound of claim 1 wherein R is ethyl.
6. The compound of claim 1 wherein R is lower saturated acylic acyl.
7. The compound of claim 1 wherein R is acetyl.
8. The compound of claim 1 wherein R is benzyl.
9. An animal feed comprising a nutrient ration and a growth promoting amount of the compound of claim 1.
10. An animal feed comprising a nutrient ration and a growth promoting amount of the compound of claim 2.

No references cited.

A. LOUIS MONACELL, *Primary Examiner.*

H. H. KLARE, *Assistant Examiner.*